Figure 1:
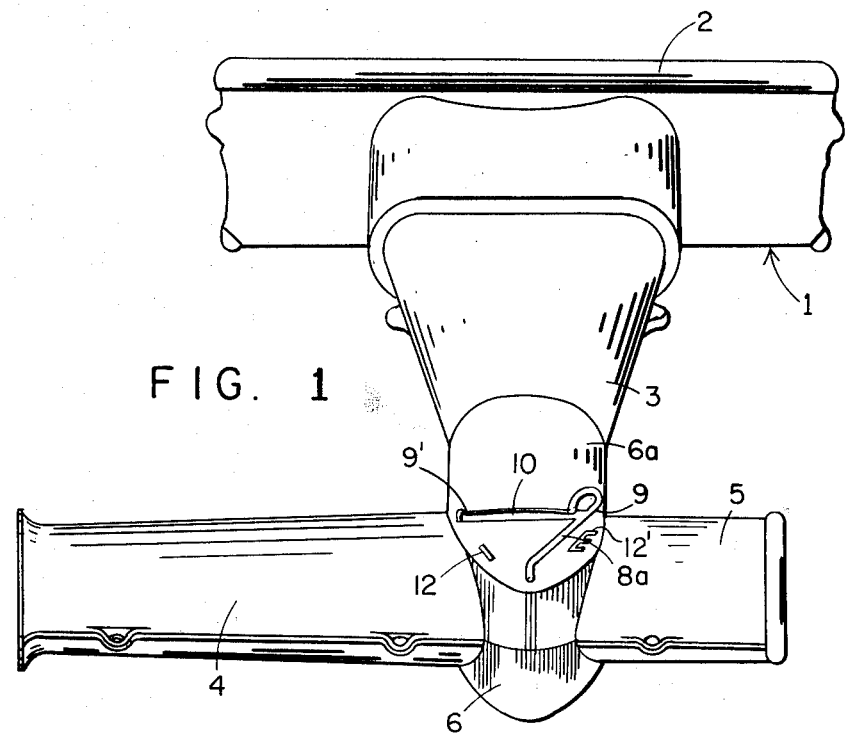

United States Patent

[11] 3,581,770

| [72] | Inventor | Vincenzo Cerrato<br>Turin, Italy |
|---|---|---|
| [21] | Appl. No | 846,199 |
| [22] | Filed | July 30, 1969 |
| [45] | Patented | June 1, 1971 |
| [73] | Assignee | Fram Corporation<br>East Providence, R.I. |
| [32] | Priority | May 31, 1969 |
| [33] | | Italy |
| [31] | | 4613-A/69 |

[54] VALVE
4 Claims, 4 Drawing Figs.

[52] U.S. Cl. ................................................. 137/625.4
[51] Int. Cl. ................................................. F16k 11/02
[50] Field of Search ............................................ 137/625.4,
625.44, 612, 525.3, 111; 251/298

[56] References Cited
UNITED STATES PATENTS

| 1,636,461 | 7/1927 | Colburn | 251/298 |
| 1,708,380 | 4/1929 | Deacon | 137/625.4X |
| 2,252,501 | 8/1941 | Foresman | 137/625.4X |
| 2,782,962 | 2/1957 | Mercer | 251/298X |
| 2,864,394 | 12/1958 | Hemple | 137/525.3X |
| 3,115,155 | 12/1963 | Clark | 137/525.3X |
| 3,460,558 | 8/1969 | Johannisson | 137/525.3X |

*Primary Examiner*—M. Cary Nelson
*Assistant Examiner*—Michael O. Sturm
*Attorney*—W. R. Hulbert

ABSTRACT: Valve assembly in a fluid flow system, a resilient plate being pivotally movable between an open portion spaced from an arcuate valve seat and a closed portion in which the plate is flexed in a curved configuration to deflect fluid flowing past the plate without appreciable pressure loss.

PATENTED JUN 1 1971 3,581,770

SHEET 1 OF 2

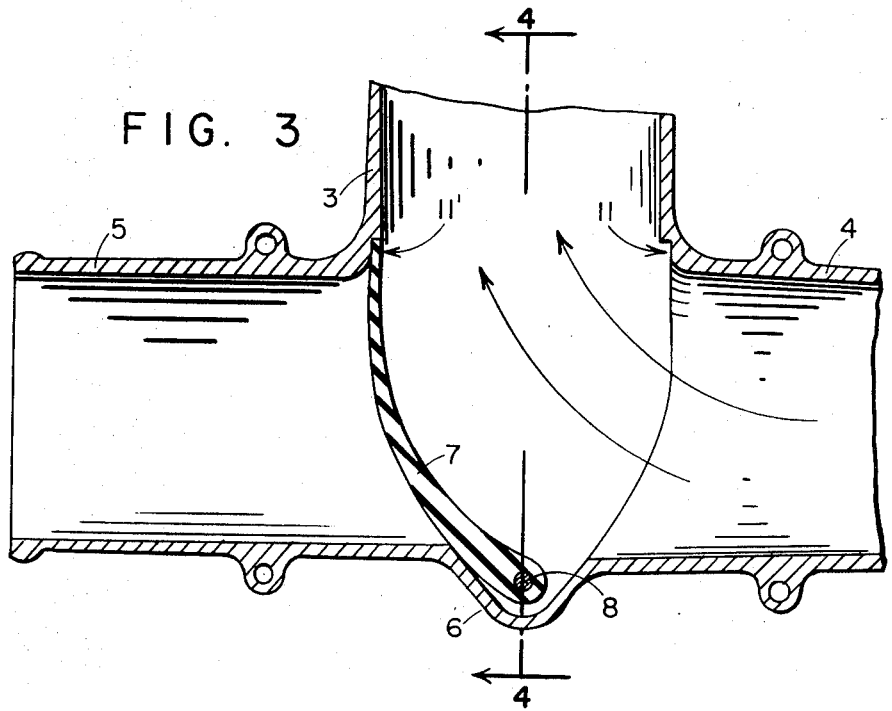
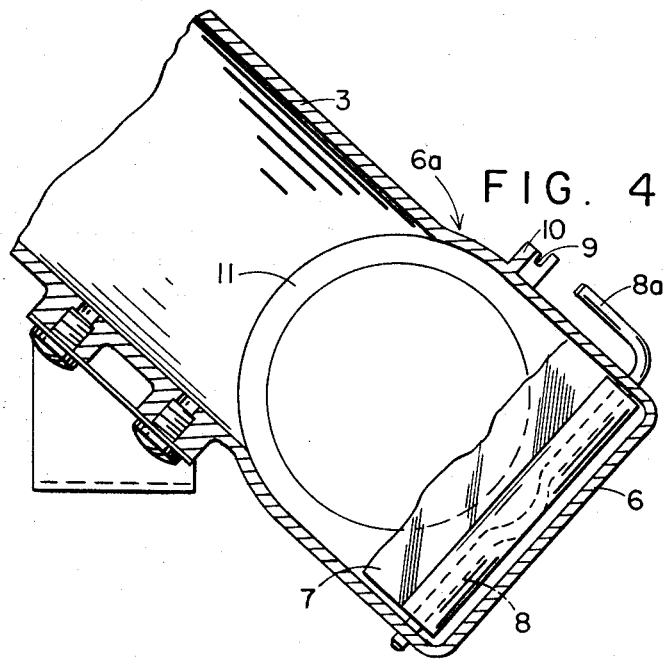

VALVE

This invention relates to valves, and more particularly to valves for use in air cleaners for internal combustion engines on motor vehicles.

An object of the invention is to provide a valve, which is extremely simple, tough and inexpensive in construction, easily operable from the outside and safely held in its selected position against any accidental displacement therefrom. Other objects of the invention are to provide a three-way valve to be fitted to the air intake on the filter casing in order to draw in air through either inlet without causing any appreciable pressure loss in the airflow through the air intake; and in which the inlet which is not being utilized in the operative position selected is totally intercepted.

The invention features, in a fluid flow system, a valve assembly in which a resilient valve plate is pivotally movable between an open position spaced from a valve seat of substantially arcuate shape, and a closed position in which the plate is flexed in a curved configuration to deflect fluid flowing past the plate without appreciable pressure loss. In preferred embodiments the invention features a three-way valve in which a flexible plate of resiliently deformable material, such as rubber, is fastened by an enlarged end on a cross pin fulcrumed to a connector to which the three ways converge and provided with an outer operating handle, the flexible plate alternately cooperating by its free end with each of two opposed seats of substantially arcuate shape, situated near the regions at which the central way merges into the two opposed lateral ways, means being provided allowing the pin to be angularly displaced from the outside from an operative position to the other through an extent exceeding the strictly necessary range for shifting the plate from one seat to the other so that on coming into contact with either seat the plate flexes and takes a curved configuration adapted to deflect the inflowing air without causing any appreciable pressure loss.

Figure 2:
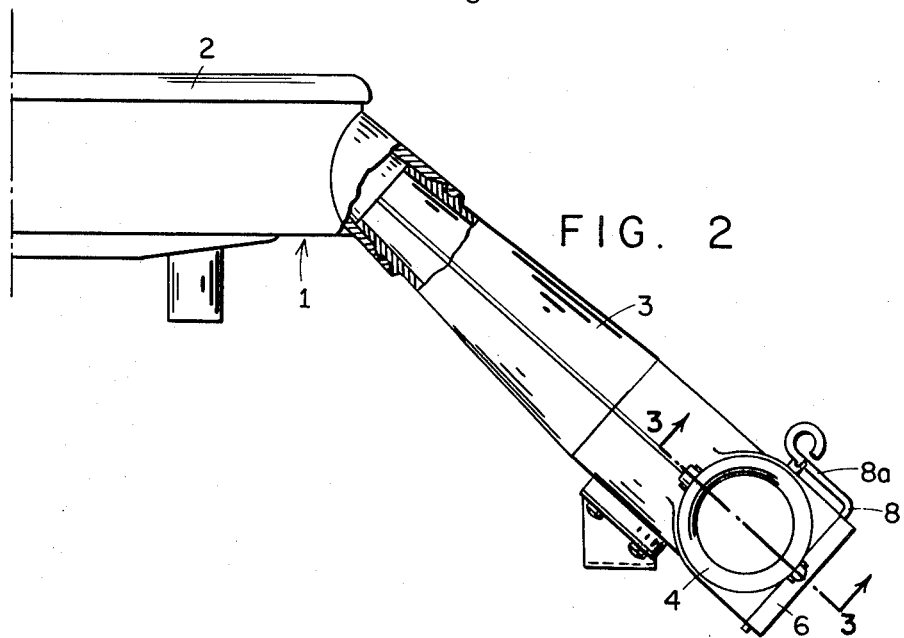

Further characteristic features and advantages of the invention will be understood from the appended detailed description referring to the accompanying drawings given by way of example only, wherein:

FIG. 1 is a side elevational view of an air cleaner for internal combustion engines provided with a three-way valve according to the invention, FIG. 2 is a front elevational view, FIG. 3 is a longitudinal sectional view of the valve on line 3—3 of FIG. 2, and FIG. 4 is a cross-sectional view of the valve on line 4—4 of FIG. 3.

Referring to FIGS. 1 and 2, numeral 1 denotes the filter casing accommodating the filtering member, 2 denoting the cover fitted to the top of the casing.

The casing 1 is laterally connected with an inclined air intake 3 having attached to its lower end two opposed conduits 4 and 5 providing the respective air inlets.

The one conduit 4, which is of greater length, is turned towards the outside of the engine in order to draw in air at ambient temperature, the other conduit 5 being turned towards a hot part of the engine in order to draw in preheated air. The conduits 4, 5 are therefore alternately employed in the warm and cold periods of the year, respectively.

A three-way valve is internally interposed between the two conduits and comprises a plate 7 of resiliently flexible material, such as rubber, mounted at one end on a cross pin 8 supported by a connector 6 to which the two opposed conduits 4, 5 and main air intake 3 are connected.

The movable valve member 7 is tapered in cross section starting from its pin-supported end towards its free end.

The pin 8 securely fixed to the movable valve member 7 protrudes outwardly from the connector 6 and is provided with a cranked portion 8a formed with a terminal loop and acting as operating handle.

The looped portion cooperates with two notches 9, 9' formed in a rib 10 of arcuate profile, extending from an exposed face 6a of the connector 6.

The free end of the movable valve member 7 is of an arcuate contour and alternately cooperates with two opposed arcuate seats 11, 11' formed in the regions at which the central conduit 3 merges into the two opposed inlet conduits 4, 5 respectively.

In order to shift the valve member from either operative position to the other and draw in air either through conduit 4 or conduit 5, it will be sufficient to switch the lever 8a from a notch 9 or 9' to the other. This causes the valve member 7 to perform an angular displacement exceeding in width the strictly necessary extent for shifting the member from a seat 11, 11' to the other.

Consequently, when the movable valve member 7 comes into contact with the one seat 11 or 11', it flexes and takes an arcuate configuration, as shown in FIG. 3, whereby the airflow from either inlet conduit directed towards the central intake conduit 3 is deflected without undergoing any appreciable pressure loss.

By virtue of the resiliency of its material the valve member closes the seat 11, 11' on which it bears, thereby safely cutting off the conduit which is not being utilized.

The notches 9, 9' serve for accurately positioning the valve member in its respective operative positions and lock the member in the selected position against the resilient reaction of the member which would tend to straighten it up.

The exposed face 6a of the connector 6 is provided, if desired, with marks 12, 12' at the notches 9, 9' for identifying the condition of the air intake in the warm and cold period of the year, respectively.

In the embodiment shown the conduits 4, 5 and central air intake 3 are formed by symmetrical flanged shells preferably moulded from plastics and fastened together by screws or rivets.

It will be understood that the principle of the invention being left unchanged the embodiments and constructional details may be modified with respect to the example described and shown without departing from the scope of the invention.

Other embodiments will occur to those skilled in the art and are within the following claims.

What I claim is:

1. In a fluid flow system having a conduit with an arcuate valve seat through which fluid flows when the seat is open and past which fluid flows when the seat is closed, that improvement characterized by
    a resilient valve plate pivotally mounted at one end on a shaft for movement between an open position spaced from said seat and a closed position in which said plate is flexed in a curved configuration to deflect fluid flowing past said plate without appreciable pressure loss.

2. The improvement of claim 1 further characterized in that said one end of said plate is enlarged.

3. The improvement of claim 1 wherein said plate is mounted for pivotal movement between two opposed angularly spaced valve seats of arcuate shape in a three-way valve for the air intake system of an air cleaner for an internal combustion engine, said system including hot and cold air intake conduits adjacent which said seats are respectively disposed, said shaft being pivotable about its axis through an angle exceeding the angular spacing between said seats.

4. Three-way valve as claimed in claim 3, characterized by the fact that said shaft is formed with a cranked outer portion acting as an operating lever adapted to alternately engage in notches formed in an exterior wall of said system corresponding to said open and closed valve positions, respectively, the spacing of the notches being such that the angular displacement performed by said plate on switching over from one said position to the other causes said plate to flex by abutment against the respective said seat.